March 30, 1971   J. H. LEMELSON   3,573,045
SCANNING TECHNIQUE, IMAGE AND ARTICLE PRODUCED THEREFROM
Original Filed Jan. 16, 1956

INVENTOR.
Jerome H. Lemelson

United States Patent Office 3,573,045
Patented Mar. 30, 1971

3,573,045
SCANNING TECHNIQUE, IMAGE AND ARTICLE PRODUCED THEREFROM
Jerome H. Lemelson, 85 Rector St., Metuchen, N.J. 08840
Application Jan. 31, 1962, Ser. No. 170,199, which is a division of application Ser. No. 559,232, Jan. 16, 1956. Divided and this application Feb. 1, 1966, Ser. No. 524,321
Int. Cl. G03c 5/04
U.S. Cl. 96—27
13 Claims

ABSTRACT OF THE DISCLOSURE

A method for forming a continuous photograph of a three-dimensional object which includes moving either the object or a camera continuously so that the camera views the entire surface of the object in a single continuous movement and passing a narrow band of light from the object onto a moving film strip which continuously moves past the light receiving mechanism of the camera to continuously expose the film strip. This continuous photograph of the entire surface of the object can then be printed on a thermoplastic or other formable material and the thermoplastic then molded about the original object photographed, or a model of the object having the same contours, to form a molded article; or the continuous photograph can be re-projected onto a model of the object having the same contours as the original object, and whose surface is light sensitive to thereby develop the photograph onto the second object.

Figure 1:
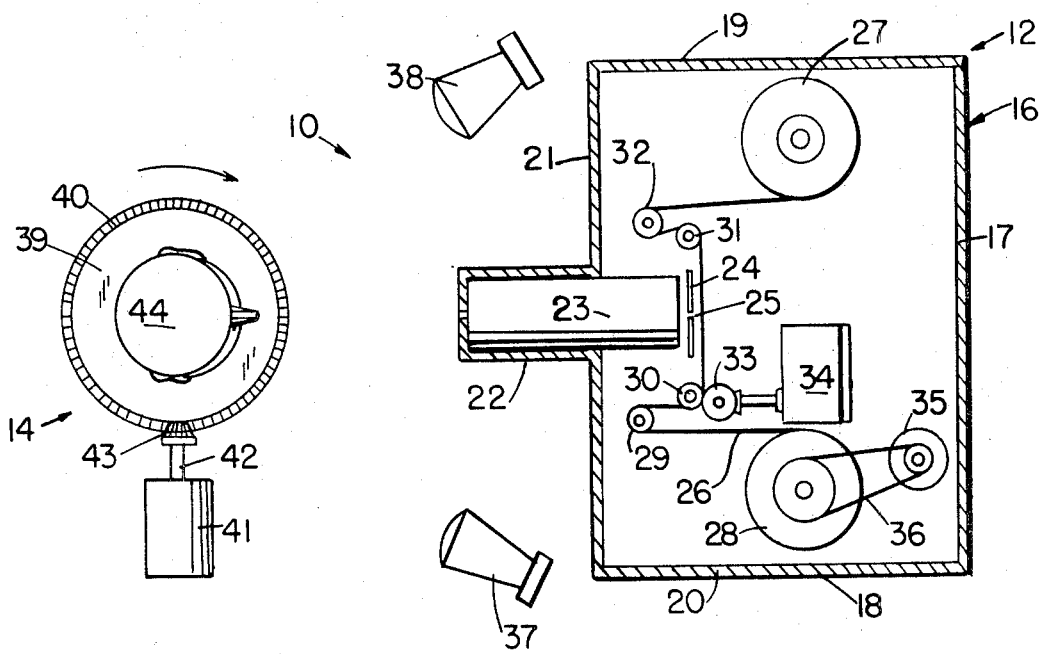

This invention relates to a method of photography and mapping and is a division of my copending application Ser. No. 170,199 filed on Jan. 31, 1962, for Camera Apparatus for Producing a Plane Pictorial Representation of a Three Dimensional Surface, having a parent application Ser. No. 559,232 filed on Jan. 16, 1956. In particular, this invention relates to a method of photographing irregular surfaces and images of the internal structures of objects by relatively moving a camera and the object and scanning in synchronization with movement of a film strip in the camera so as to generate a flat image of the surface or structure being scanned.

It is known in the art to photograph a predetermined area of the surface of an object by means of conventional photography in which the aperture of a conventionar camera is opened for a predetermined period of time during which light from the object is directed against a generally rectangular area of photographic film. If a larger area than can be accommodated by the camera is desired to be photographed, generally a series of different rectangular exposures or frames are photographed and are pieced together per se or oriented, spliced and then pieced together. It is obvious that the conventional technique of photographing the surface of a three dimensional member by means of deriving one or more still images of the surface of an object has many shortcomings and will not give an accurate picture of the surface particularly if the object has substantial curvature in relation to the focus of the camera. Portions of the surface, so photographed, which slope sharply away from the camera will present distorted images and may be out of focus. Inaccuracies and human errors may be introduced during the alignment and joining of a plurality of single frame photographs to form a map of the object's surface.

Accordingly, it is a primary object of this invention to provide a new and improved camera apparatus and a method of photographing a three dimensional object or curved surface which will provide a single image which is an improved representation of the surface of the object in comparison to the representation obtained by means of a conventional camera.

Another object is to provide a new and improved method of photographing irregular surfaces.

Another object is to provide a new and improved method of recording images of the internal structure of objects generated by X-rays and the like.

Another object is to provide a method of providing strip photographs of surfaces of articles wherein the relative sizes of images on said surfaces is more precisely recorded and may be more accurately determined than by conventional photography.

Another object is to provide a method of providing strip photographs of surfaces of revolution such as cylindrical and spherical surfaces and the like wherein the photograph is a substantially more accurate map of the surface than that obtained with a conventional camera.

Another object is to provide a method of recording X-ray images and the like of the internal structures of objects by strip photography effected in such a manner as to provide X-ray images having a greater degree of scale accuracy than attained using conventional photography.

Another object is to provide a new and improved surface or sub-surface scanning apparatus employing one or more intense radiation beams such as laser and/or X-rays and automatic analysis means for indicating the locations of flaws and other predetermined surface or sub-surface conditions.

With the above and such other objects as may hereafter more fully appear, the invention consists of the novel constructions, combinations, arrangements of parts and methods as will be more fully described and illustrated in the accompanying drawings, but it is to be understood that changes, variations and modifications may be resorted to which fall within the scope of the invention as claimed.

Figure 2:
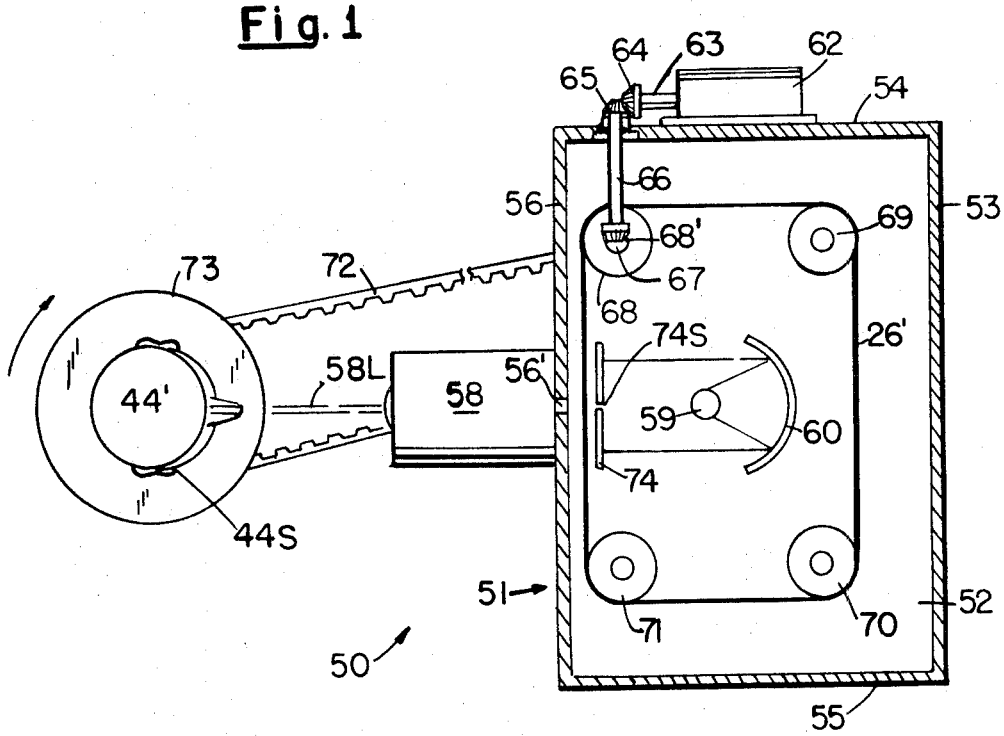

In the drawings:

FIG. 1 is a plan view with parts removed for clarity showing components of a surface mapping camera apparatus, and FIG. 2 is a plan view of the components of a projector and photosensitized object receiving light therefrom which is derived by scanning film exposed in camera apparatus of the type provided in FIG. 1.

There is shown in FIG. 1 a camera apparatus employing the controlled movement of a subject to be photographed and what will hereafter be referred to as a periphery camera having a film which is exposed and controlled in movement during its exposure past the optical system of the camera. The apparatus 10 comprises a camera assembly 12 and a subject assembly 14 disposed immediately in front of the optical system 23 of the camera. The subject apparatus 14 comprises an object 44, the surface of which is desired to be mapped or photographed, which object is mounted on a turntable 39 which is rotated by means of a servo motor 41. The camera apparatus comprises a housing 16 having enclosing walls including a rear wall 17, side walls 18 and 19, a front wall 21, and end walls, one of which, 20, is illustrated in the cross-sectional view. A projecting portion 22 of the front wall 21 retains a housing 23 containing optical components for receiving and imaging light from the surface of the object 44 within the camera. Mounted at the rear of the optical system housing 22 is a mask 24 having a slit 25" therein permitting the passage of only a thin bank of the total image derived in scanning the facing portion of the object 44 to an adjacent film strip 26 which is driven at constant speed controlled past said slit by means of a drive including constant speed motor 34. The film is driven from a supply reel 27 which is supported in bearing on a shaft supported by the walls of the housing to a takeup reel 28 which is also rotationally supported by bearing means secured to the side walls of the housing. The transport for the film comprises a plurality of idlers 29, 30, 31 and 32. Idler 30 cooperates with a frictional or sprocket drive wheel 33 which is driven by motor 34 and is effective in lineally moving the film 26 at a speed which is substantially equivalent to the velocity at which the surface of the object being photographed is moving such that the film will be exposed to an image light pattern which is a developed map of the convex surface being scanned derived by line scanning through the slit 25 in the mask 24. The resulting image developed in the film strip as a result of said scanning may be defined as a flat picture of the surface of the three dimensional object 44 being scanned. Notation 35 refers to a motor and drive for the takeup reel 28 which receives and stores the exposed film and which is preferably operated in accordance with conventional drive means including a belt 36 utilized to drive the conventional takeup reel of a projector or camera.

Rotation of the turntable 39 is illustrated as being effected by means of a bevel gear 40 formed of or provided on the periphery of the turntable 39 which mates with and is driven by a bevel gear 43 secured to the shaft 42 of drive motor 41. It is noted that the shaft 42 may be also directly coupled to the shaft of film driving motor 34 to effect synchronization of the movement of the film and rotation of the turntable 39 thereby eliminating the need for a separate drive motor such as 41 and means for controlling said motor so that it operates the turntable in synchronization with the film driving means of the camera. Light for illuminating the surface of the object 44 is provided by a plurality of flood lamps 37, 38, etc. The surface of the object being mapped may also be illuminated by one or more sources of coherent light generated by optical masers. A line source of laser light may also be utilized to illuminate the surface of the object along line area thereof being scanned whereupon it may be possible to eliminate the mask 24 if the line source is synchronized to move with the camera or is projected against the moving surface band area being scanned.

The photographic apparatus illustrated in FIG. 1 may be applied in the production of various articles of manufacture and in the study of mapping of various convex of concavo-convex articles, bodies or surfaces. A conventional photograph derived by exposing a rectangular film frame to an image pattern received through a camera lens during a single opening and closing of the camera shutter, provides an image of an object, the sloping or receding surfaces of which are not to scale and are distorted. Surface measurements based on such photographs, such as distances between points, slopes and other characteristics are difficult to make with precision and frequently require the use of complex stereoscopic apparatus. Accordingly, employment of the apparatus and method of surface photography described in FIG. 1 may be utilized to simplify surface measurement and mapping.

In the production of various three dimensional or relief displays, the art of vacuum or pressure forming a sheet of printed thermoplastic material is employed. The production of the printing plates for illustrating such display sheet material is generally based on rule-of-thumb and trial and error techniques which are tedious and time consuming. Accordingly, the following procedure is proposed for simplifying and improving such procedures for art, plate and model preparation which procedure will result in an improved and more accurate finished product.

(a) A model of the desired three dimensional article or display is first constructed of any suitable material. The model is preferably the undecorated product itself although it may be the model, from which the mold or die used to mold or shape the final product is formed. The model is then hand illustrated or decorated or surface decorated by any suitable method.

(b) The model is next placed in the position of the object 44 on the turntable 39 of FIG. 1. The position is preferably such that the rotational axis of the turntable passes through or near the centroid or center of volume of the model or defines an axis about which the surface being scanned is substantially rotating. For irregularly shaped concavo-convex objects such as illustrated in FIG. 1 a single axis cannot be defined about which all points on the surface of the object will revolve. However, for most concave objects as axis may be determined about which the scanned surface may rotate which will yield useful results.

(c) The flat photograph derived by scanning the original surface may be employed to produce a printing plate which is used to print flat sheets of formable material such as plastic which, when vacuum or pressure formed to the contour of the original object, if the illustration derived from said plate is in registry with the mold or forming die, will have its surface decorated with image areas in the same positions thereon as the decorations or illustrations on the original model. All hand layout and trial and error procedures are thus eliminated from such procedure.

By utilizing the above procedure, display devices may be produced in which the surface illustration is derived by peripherally photographing a living animal, human being or manufactured article. For example, a plastic may be thermoformed or molded to substantially the full contour or half the contour of the subject being copied, although not necessarily the same size. The above described technique of plate preparation may be employed for printing halftone images or the like which are flat developments of the image derived from the surface of a living human being, animal or article. Upon registration with a forming die or mold, if formed to part of the contour of the originally photographed subject, the surface so illustrated will be a substantially accurate and realistic reproduction of the original model.

A projection technique as illustrated in FIG. 2 may also be employed to photographically illustrate the surface of a three dimensional article scaled or copied from that originally photographed. FIG. 2 illustrates an apparatus for exposing the photosensitized surface 44S of an object 44' which is similarly shaped to the original object 44 and mounted to receive an image pattern of light along portions of its surface corresponding to similarly shaped portions of the surface of the originally photographed object 44. A replica having the same surface decoration, illustration, or other features as the surface of the original object 44 may thus be produced. However, it is noted that the object 44' need not necessarily be the same scale or size as the object 44 since the projection apparatus 51 of FIG. 2 may be provided with an image enlarging or reducing optical projection system. The apparatus 50 consists of a projector 51 having a housing 52 consisting of a rear wall 53, side walls 54 and 55, a front wall 56 and end walls one of which 57 is illustrated in the cross-sectional view. Disposed against the front wall 56 is a housing 58 containing optical projection apparatus for receiving light from a light source mounted within the housing 52 through an opening 56' in the front wall 56. A section of film 26' which has been derived by developing and fixing the film 26 exposed in the apparatus illustrated in FIG. 1 is provided as a closed loop and is driven, as illustrated, in a closed loop path around four pulleys or wheels 68 to 71. At least one of said wheels or drums 68 is driven by means of a constant speed motor and drive 62 through shafts 63 and 66 which are coupled through gears 64 and 65. A gear assembly 67 couples the shaft 66 extending into the housing with the shaft of drum 68 which is supported in bearing by the end walls of the housing 52. Operating off the shaft 68' on which the drum 68 is mounted is a driving belt 72 connected to a pulley (not shown) secured to shaft 68' and connected at its other end to a toothed pulley, also not shown, secured to a turntable 73 at its center of rotation which turntable mounts the object 44' to be exposed to the light modulated by the film 26'.

Since parallel light is desirable to scan the image developed in the film 26', a suitable reflector 60 is provided behind light source 59 and lens means 61 causes parallel light to be image on a mask 74 having a slit 74S therein for passing a narrow band of light through the film. The mask 74 may also be provided as part of the projection optical system mounted within housing 58. The output of 58 is a narrow band of parallel light which is projected against the proper portion of the surface 44S of the object 44' which surface is covered with or comprises a photo-sensitive material.

In the operation of the apparatus of FIG. 2 the object must be initially so positioned that a band portion of its surface will receive a band of light passed through that portion of the developed film strip 26' which received an image from a band of light scanning an area of the original object 44 similar to the area of the object 44'. By synchronizing the movement of the exposed film 26" and the rotation of table 73 such that all areas of the photosensitized surface of the copy object 44' are exposed to light received from similar areas of the original object 44, the same image as photographed of the original object may be developed in the copy object.

The object being scanned may have any suitable convex or concavo-convex shape but is preferably void of sharp and deep inflections in the surface contour thereof in or on which shadows would be cast and would be difficult to eliminate. The camera apparatus illustrated may be used to scan and provide a developed photograph of the head of a human being as well as other objects. Developed photographs of industrial models, components, machinery and the like may be provided for two dimensional analyses thereof.

If the surface contour of the object being scanned varies substantially, the camera may be mounted on a movable base which is guided in a path towards and away from the turntable and is driven by a motor which is controlled by a programming or contour following means to move towards and away from the turntable as the latter rotates so as to remain a constant distance away from the surface being scanned or rotated in accordance with changes in the attitude of the surface being scanned so as to receive an image which is viewed normal to the surface being scanned by the optical scanning system.

The turntable 39 may also be tiltable and positionally controlled in tilt by a servo other than 41 which servo is program controlled and/or otherwise controlled by, for example, contour sensing and control means as applied for example to the control of metal working cutting tools to predetermine the distance to be maintained from the surface and/or angle of the scanning axis or plane across the surface of the object being photographed. If programming control is employed to control the relative positions and attitudes of the camera, and object being photographed, servo means may be controlled by said programming control to predetermine camera focus, lens opening at different points in a scanning cycle, etc. for both photographing and projecting the photographed image to account or compensate for surface irregularities, shadows, etc.

In lieu of rotating the object 44 being scanned, said object may be mounted fixed while the camera is orbited or swings about an axis around the object through which said axis preferably passes through the centroid of the object. The camera, in such an arrangement, may be mounted on a carriage which travels a circular or otherwise contoured track or on an arm which is guided or pivoted to swing around the object being scanned. Servo driven means may also be provided to position the camera along the carriage or arm at predetermined distances away from the object being scanned and in a plurality of predetermined attitudes relative to the surface being scanned so that a pictorial presentation is provided on film of the surface being scanned which is either determined by manual control or in accordance with a programmed cycle. The attitude of the camera may also be controlled by means of a contour sensor riding against or positioned away from the surface whereby the scanning axis of the camera will always be normal or at any predetermined angle to the surface being scanned.

It is also noted that the closed loop film-strip 26 may be replaced by a rotating disc or drum having a sensitized surface or circular band area adapted for receiving light energy in the form of an image line as described and adapted to be rotated in synchronization with the relative movement of the camera or scanner and the object being scanned whereby a circular or cylindrical band image is developed or developed therein as may be scanned or projected as described.

It is noted that the apparatus illustrated in FIGS. 1 and 2 may be modified for mapping not only the surface of the article being scanned but also for investigating and providing a peripheral representation of certain internal or other characteristics of an article or assembly. For example, the photographic camera may be replaced by an infra-red receiver, image generator and recorder adapted to receive infra-red radiation generated internally within the surface or article and record on photographic film in the shape of a film-strip as illustrated, recording disc or drum of sensitized material, by means of a line image as described which line of radiation provides a visual presentation of characteristics of either the surface and/or interior of the object being scanned. Other forms of radiation may comprise (a) a line or band of X-ray or other similar material penetrating radiation modulated in passing through the object being scanned and moved relative to the object and camera in synchronization with the movement of the film; (b) radar signals reflected from the surface being scanned and converted to a visual, photographic image by means of a scope. Movement of the object being scanned in a rotary path as described may suffice to provide a changing image on a oscilloscope which the camera optical system scans and presents a line presentation against the moving film in the manner desribed.

Since certain changes may be made in the above process and apparatus without departing from the scope of the invention herein involved, it is intended that all matter contained in the above description or shown in the accompanying drawings shall be interpreted as illustrative and not in a limiting sense.

In another embodiment of the invention, it is noted that the photographic camera 12 of FIG. 1 may be replaced by other forms of recording apparatus for mapping the surface of the subject being scanned or otherwise recording information about said surface. For example, the scanning device may comprise a television camera or flying spot scanner operative to generate a scanning or reading beam which scans back and forth preferably along a line in the plane of the axis of rotation of the object being scanned if said object is rotated relative the scanner, or if the scanner rotates about the object, along a line in the plane of the axis of rotation of the scanner. The resulting video picture signal may be immediately analyzed, recorded on magnetic tape or other medium for later analysis or used to modulate the write-beam of a video image tube or screen so as to provide an image thereon which is essentially a flat picture or surface map of the three dimensional object being scanned. Such beam scanning is effected by suitably deflection controlling the scanning beam of the television camera or flying spot scanner by repetitively generating so called horizontal sync signals with suitable line blanking signals and flyback signals for the beam without generating vertical sync signals to deflection control the beam to scan back and forth or repetitively scan the same line while so called vertical deflection is afforded to the scanning by the relative movement of the scanner and the object being scanned. The flat pictorial image derived from modulating an image storage tube write-beam with the resulting video picture signal may be visually analyzed for image irregularities or imperfections and photographed, if necessary or the picture signal per se may be automatically analyzed by means such as described in my Patent 3,081,-379 for an Automatic Measurement Apparatus. If X-ray means are employed for investigating the internal structure or wall of the object 44 being scanned, a source of X-radiation or gamma rays may be disposed within or to the other side of the object being scanned in line with a receiver for said radiation with a slotted mask disposed between the receiver and the source of radiation to provide a line or narrow band radiation image of the structure being scanned. By replacing the photographic film of the apparatus of FIGS. 1 or 2 with an image generating device such as a fluoroscopic screen or other form of image conversion and storage medium operative to generate and store the X-ray or gamma ray image therein and moving same by means of a suitable servo driven apparatus past the stollet mask, the desired flat image of the X-ray scanned object may be generated in said storage medium which may be directly viewed or scanned by a television camera. The resulting picture signal generated by said television camera may be recorded on magnetic tape or immediately analyzed as described or used to modulate the write-beam of a television picture tube such as an image storage tube for visual analysis of the structure scanned. If visual analysis of the image indicates the need to record same or further analyze same, a read beam may be generated to read the storage tube image and the resulting video signal analyzed by automatic means, recorded or otherwise operated on. Suitable image intensifying means may be provided to improve the quality of the images so generated or signals derived therefrom.

If, during the automatic scanning of the surface and/or internal structure of an object as described, it is desired to automatically indicate on the object itself where a flaw or particular surface or internal condition occurs such indication may be affected by one or more means as follows. If the scanning means comprises a flying spot scanner operative to generate a beam which repeatedly scans at fixed frequency along the same line as the object and scanner move relative to each other, the resulting picture signal may be automatically analyzed as defined in patent 3,081,379 and when the amplitude and/or frequency thereof reaches a predetermined value, a control signal may be generated as described in said patent which may be used to effect one or more actions. Such actions may include (a) stoppage of the servomotor (41) which relatively moves the object and scanning device and concentration or direction of the scanning beam or an auxiliary beam of radiation on the area or spot of the surface of said object aligned with the scanning axis of the scanning device so as to locate the particular flaw or other condition, (b) sudden increase in the intensity of the scanning beam so as to discolor, heat or burn the surface or a coating on the surface of the substrate being scanned, (c) projection of a marking fluid against that area of the surface scanned when the control signal is generated by a nozzle device operative to follow or lead the scanning beam, etc. If surface scanning is effected by a beam of intense radiation such as monochromatic light generated by a laser with the beam operative to be deflected back and forth along a line as the object and laser rotate or translate relative to each other with a receiver for the reflected light being a photosensor, television camera or other device operative to generate a variable video-type signal of the scanning light received, then said control signal generated when the video-type signal reaches a predetermined value may be used to increase the intensity of the laser generated light to a degree where it will heat, discolor, burn or drill a hole in the surface being scanned or a coating thereon, to indicate the location of flaws, defects or other predetermined conditions. Such an intensity modulated laser beam may also be utilized to indicate the location of or burn out flaws beneath the surface of the object being scanned if the laser beam or deflection control therefore is synchronized in its operation so as to cause the beam to intersect that area of the surface of the object through which penetrating radiation such as X-rays are passing and to scan substantially the same spot area of the surface a line source of the penetrating radiation passes through as scanning progresses as described. When the control signal is generated, the beam of light or other form of intense radiation intersecting the area being scanned by the X-rays is increased in intensity or generated to intersect the surface beneath which the flaw or predetermined condition occurs so as to intersect and effect one of the described changes in matter for indicating the location of the condition.

Having thus described the invention, when considered in connection with the accompanying drawings, it is believed that the scanning techniques and apparatus will be clearly understood and while I have herein shown and described specific embodiments of the invention, I do not limit myself as to the details herein except for such limitations as may be defined in the appended claims.

I claim:
1. A method of photography, comprising:
   (a) relatively positioning a photographic recording means and an object means to be photographed whereby photographically recordable radiation derived from said object means is received by said recording means;
   (b) generating photographically recordable radiation representing the relative contouring of said object means by exposing said object means to photographically recordable radiation;
   (c) continuously passing a narrow band of said generated radiation to said recording means;
   (d) continuously moving at least one of said object means and said recording means to cause relative movement of the two while maintaining said recording means in radiation receiving relationship to said object means; and
   (e) moving a filmstrip past the radiation receiving mechanism of said recording means while simultaneously and continuously exposing said filmstrip to said narrow band of generated radiation;
   (f) said relative movement of said object means and said recording means being synchronized with said movement of said filmstrip to produce a continuous recording of at least a portion of said object means substantially greater than the width of said narrow band of generated radiation.

2. A method in accordance with claim 1 wherein the narrow band of generated radiation is produced by forming a mask having a narrow slit between the radiation receiving mechanism of the recording means and the filmstrip.

3. A method in accordance with claim 1 wherein the photographically recordable radiation is generated by directing light against the surface of the photographed object means and reflecting at least a part of said light to the photographic recording means.

4. A method in accordance with claim 2 wherein light is directed against the surface of the object means being photographed in an intermittent sequence of pulses and said filmstrip is intermittently moved in synchronism with said light pulses whereby a fresh strip of said filmstrip is exposed to said light passing through the narrow slit each time said light is pulsed.

5. A method in accordance with claim 1 in which the relative movement between the object means and the recording means is effected by moving at least part of the recording means past the object means.

6. A method in accordance with claim 1 wherein the relative movement between the object means and the recording means is effected by moving said object means past said recording means.

7. A method in accordance with claim 1 wherein the recordable radiation is X-ray radiation and a continuous recording of at least a portion of the interior of the object means subjected to said X-ray radiation is produced.

8. A method in accordance with claim 3 wherein the light is a narrow beam of coherent light generated by an optical maser.

9. A method in accordance with claim 3 wherein the light is a narrow beam of coherent light generated by an optical laser.

10. A method of producing articles of manufacture having contoured surfaces comprising:
  (a) relatively positioning a photographic recording means and an object means to be photographed whereby photographically recordable radiation derived from said object means is received by said recording means;
  (b) generating photographically recordable radiation representing the relative contouring of said object means by exposing said object means to photographically recordable radiation;
  (c) continuously passing a narrow band of said generated radiation to said recording means;
  (d) continuously moving at least one of said object means and said recording means to cause relative movement of the two while maintaining said recording means in radiation receiving relationship to said object means; and
  (e) moving a filmstrip past the radiation receiving mechanism of said recording means while simultaneously and continuously exposing said filmstrip to said narrow band of generated radiation;
  (f) said relative movement of said object means and said recording means being synchronized with said movement of said filmstrip to produce a continuous recording of at least a portion of said object means substantially greater than the width of said narrow band of generated radiation;
  (g) reproducing said continuous photographic recording on a flat sheet of formable material; and
  (h) forming said sheet of formable material to conform the contour thereof to the contour of at least a part of an object means having substantially the same contour as the object means photographed.

11. A method in accordance with claim 10 wherein the formable material is a thermoplastic material and the sheet is formed about the object means thermally.

12. A method in accordance with claim 10 wherein the photographed object means and the object means about which the sheet of formable material is formed in the same object means.

13. A method of photographically decorating articles of manufacture having contoured surfaces comprising:
  (a) relatively positioning a photographic recording means and an object means to be photographed whereby photographically recordable radiation derived from said object means is received by said recording means;
  (b) generating photographically recordable radiation representing the relative contouring of said object means by exposing said object means to photographically recordable radiation;
  (c) continuously passing a narrow band of said generated radiation to said recording means;
  (d) continuously moving at least one of said object means and said recording means to cause relative movement of the two while maintaining said recording means in radiation receiving relationship to said object means;
  (e) moving a filmstrip past the radiation receiving mechanism of said recording means while simultaneously and continuously exposing said filmstrip to said narrow band of generated radiation;
  (f) said relative movement of said object means and said recording means being synchronized with said movement of said filmstrip to produce a continuous recording of at least a portion of said object means substantially greater than the width of said narrow band of generated radiation;
  (g) forming a second object means having substantially the same contouring as said photographed object means and having at least a portion thereof photosensitive;
  (h) positioning said second object means and a photographic projecting means in relative positions whereby projected light from said projecting means is received by said object means;
  (i) continuously reproducing a narrow band of said photographic recording and projecting the same on said photosensitive surface of said second object means;
  (j) continuously moving at least one of said object means and said projecting means to cause relative movement of the two while maintaining said second object means in position relative to said projecting means to receive said projected narrow band of said recording; and
  (k) continuously moving said photographic recording past the photographic projecting mechanism of said projecting means;
  (l) said relative movement of said second object means and said projecting means being synchronized with said movement of said filmstrip to produce a photographic reproduction of said photographed object on said second object means.

References Cited

UNITED STATES PATENTS

| | | | |
|---|---|---|---|
| 891,013 | 6/1908 | Smith | 88—24H |
| 1,176,384 | 3/1916 | Lutka | 96—46 |
| 2,891,339 | 6/1959 | Kao | 96—40X |

NORMAN G. TORCHIN, Primary Examiner

R. E. FICHTER, Assistant Examiner

U.S. Cl. X.R.

156—58